(12) United States Patent
Cho et al.

(10) Patent No.: US 12,043,083 B2
(45) Date of Patent: Jul. 23, 2024

(54) BLOWING UNIT OF AIR CONDITIONER FOR VEHICLE

(71) Applicant: Hanon Systems, Daejeon (KR)

(72) Inventors: Hwan Kyu Cho, Daejeon (KR); Jae Woo Ko, Daejeon (KR); Jin Kuk Kim, Daejeon (KR); Chang Soo Bae, Daejeon (KR); Jong Min Lee, Daejeon (KR); Jae O Jung, Daejeon (KR); Gyu Ik Han, Daejeon (KR)

(73) Assignee: Hanon Systems, Daejeon (KR)

( * ) Notice: Subject to any disclaimer, the term of this patent is extended or adjusted under 35 U.S.C. 154(b) by 55 days.

(21) Appl. No.: 17/909,892

(22) PCT Filed: Mar. 8, 2021

(86) PCT No.: PCT/KR2021/002833
§ 371 (c)(1),
(2) Date: Sep. 7, 2022

(87) PCT Pub. No.: WO2021/182819
PCT Pub. Date: Sep. 16, 2021

(65) Prior Publication Data
US 2023/0097990 A1 Mar. 30, 2023

(30) Foreign Application Priority Data

Mar. 9, 2020 (KR) .................. 10-2020-0028945
Mar. 5, 2021 (KR) .................. 10-2021-0029411

(51) Int. Cl.
*B60H 1/00* (2006.01)
*F04D 29/42* (2006.01)

(52) U.S. Cl.
CPC ....... *B60H 1/00471* (2013.01); *F04D 29/424* (2013.01)

(58) Field of Classification Search
CPC ............... F04D 29/4213; F04D 29/424; F05D 2250/51; B60H 1/00471; B60H 2001/00085
See application file for complete search history.

(56) References Cited

U.S. PATENT DOCUMENTS 10,525,788 B2 * 1/2020 Lee ......................... B60S 1/54
2012/0057971 A1 3/2012 Mitsuishi et al.
2018/0072131 A1 * 3/2018 Lee ......................... B60S 1/023

FOREIGN PATENT DOCUMENTS

JP H07027097 A 1/1995
JP 2000225824 A 8/2000
(Continued)

*Primary Examiner* — Brian O Peters
(74) *Attorney, Agent, or Firm* — Norton Rose Fulbright US LLP; James R. Crawford

(57) ABSTRACT

Disclosed is a blowing unit of an air conditioner for a vehicle, having a two-layer structure and capable of effectively suppressing a flow of air flowing backward around a scroll bell mouth. In a blowing unit of an air conditioner for a vehicle, having a scroll case in which a first flow path and a second flow path are partitioned so as to separate inside and outdoor air to be sucked, the scroll case has a partition wall for separating a suction part of the first flow path and a suction part of the second flow path, and the partition wall has an air backflow prevention part for preventing air flowing into one of the first flow path or the second flow path from flowing backward into the other.

17 Claims, 14 Drawing Sheets

(56) References Cited

FOREIGN PATENT DOCUMENTS

| | | | |
|---|---|---|---|
| JP | 2000291595 | * | 10/2000 |
| JP | 3900965 | B2 | 1/2007 |
| JP | 2012224197 | A | 11/2012 |
| KR | 20140001403 | A | 1/2014 |

* cited by examiner

PRIOR ART

BLOWING UNIT OF AIR CONDITIONER FOR VEHICLE

CROSS REFERENCE TO RELATED APPLICATIONS

This application is a national phase under 35 U.S.C. § 371 of International Application No. PCT/KR2021/002833 filed on Mar. 8, 2021, which claims the benefit of priority from Korean Patent Applications Nos. 10-2020-0028945 filed on Mar. 9, 2020 and 10-2021-0029411 filed on Mar. 5, 2021. The entire contents of these applications are incorporated herein by reference in their entirety.

TECHNICAL FIELD

The present invention relates to a blowing unit of an air conditioner for a vehicle, and more specifically, to a blowing unit of an air conditioner for a vehicle having a two-layered structure capable of selectively sucking indoor air or outdoor air into an air-conditioning case, thereby securing defogging performance and maintaining high heating performance during heating.

BACKGROUND ART

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for a cooling action and a heater core for a heating action inside an air-conditioning case, and selectively blows the air cooled by the evaporator or heated by the heater core toward parts of the interior of the vehicle.

Especially, in order to secure defogging performance and maintain a high-performance heating during heating, a two-layer air conditioner has been developed. In order to defrost windshields while driving with heat in winter, cold outdoor air with low humidity is effective, but it causes drop of indoor temperature.

The two-layer air conditioner substantializes a two-layer air flow of indoor air and outdoor air by supplying outdoor air to the upper part of the vehicle and by circulating indoor air to the lower part of the vehicle, so as to effectively defrost using fresh outdoor air with low humidity supplied to the upper part and to maintain high-performance heating by providing fresh outdoor air to passengers and providing warm indoor air to the lower part.

Japanese Patent No. 3900965 (Jan. 12, 2007) discloses a blowing unit of a two-layer air conditioner for a vehicle. FIG. 1 is a sectional view illustrating a conventional blowing unit of a two-layer air conditioner for a vehicle.

As illustrated in FIG. 1, the blowing unit of the two-layer air conditioner for a vehicle includes a case 1. The case 1 includes an indoor air inlet 11 for introducing indoor air and an outdoor air inlet 12 for introducing outdoor air. The case 1 further includes an indoor air door 43 for adjusting the degree of opening of the indoor air inlet 11, and an outdoor air door 44 for adjusting the degree of opening of the outdoor air inlet 12. An air filter 5 is disposed at a downstream side of the indoor and outdoor air doors 43 and 44 in an air flow direction.

Dual fans 2 and 3 rotated by a motor are provided at the downstream side of the air filter 5, and a first blowing flow path 15 and a second blowing flow path 16 are partitioned by a partition 14 of the case 1 at the downstream side of the dual fans 2 and 3. The indoor air door 43 and the outdoor air door 44 are rotated around a rotary shaft 41, and a partition plate 42 is integrally formed.

The partition plate 42 includes a first plate portion 42a extending from the rotary shaft 41 toward the arc surface of the case 1, and a second plate portion 42b extending from the rotary shaft 41 toward the air filter 5. In a two-layer mode, the front end of the first plate portion 42a is positioned between the indoor air inlet 11 and the outdoor air inlet 12, so that a flow path connecting the first blowing flow path 15 is divided from a flow path connecting the second blowing flow path 15.

The conventional two-layer blowing unit has a partition wall for dividing a moving path of the indoor air and a moving path of the outdoor air around the case 1 of a scroll shape. However, the conventional two-layer blowing unit has a disadvantage in that there is blade passing frequency noise (BPT) by intake flow imbalance between the moving path of the indoor air and the moving path of the outdoor air.

DISCLOSURE

Technical Problem

Accordingly, the present invention has been made in view of the above-mentioned problems occurring in the related art, and it is an object of the present invention to provide a blowing unit of an air conditioner for a vehicle having a two-layer structure capable of effectively suppressing a flow of air flowing backward around a scroll bell mouth.

Technical Solution

To accomplish the above-mentioned objects, according to the present invention, there is provided a blowing unit of an air conditioner for a vehicle, which has a scroll case in which a first flow path and a second flow path are partitioned so as to separately suck indoor air and outdoor air, the blowing unit including: a partition wall for dividing a suction part of the first flow path and a suction part of the second flow path in the scroll case; and an air backflow prevention part disposed on the partition wall to prevent air flowing into one of the first flow path or the second flow path from flowing backward to the other.

Moreover, the first flow path is disposed above the second flow path, and the suction part of the second flow path is formed in the lateral direction of the suction part of the first flow path, and the air backflow prevention part is formed around the suction part of the first flow path.

Furthermore, the outdoor air flows through the first flow path and the indoor air flows through the second flow path, and the air backflow prevention part blocks the outdoor air introduced into the suction unit of the first flow path from flowing backward to the second flow path.

Additionally, the air backflow prevention part includes a plurality of curved ribs extending from the partition wall in a scroll direction of the suction part of the first flow path.

In addition, the plurality of curved ribs are arranged to be spaced apart from one another in the scroll direction.

Moreover, the curved ribs are composed of a first curved rib and a second curved rib which are symmetrically extended at both sides on the basis of the partition wall and are spaced apart from each other.

Furthermore, the scroll case includes an upper scroll case and a lower scroll case, and the air backflow prevention part protrudes upward from the upper surface of the upper scroll case.

Additionally, the protruding height of the air backflow prevention part is equal to or smaller than the protruding height of the partition wall.

In addition, the scroll case includes an upper suction port for introducing air into the first flow path and a lower suction port for introducing air into the second flow path, and the air backflow prevention part extends along the circumference of a bell mouth of the upper suction port.

Moreover, the air introduced into the suction part of the second flow path bypasses through a lateral flow path of the first flow path, and then, is sucked upward through the lower suction port.

Furthermore, the first curved rib and the second curved rib are formed to be less than half of the suction part of the first flow path in the circumferential direction.

Additionally, the suction part of the first flow path is formed below the outdoor air inlet, and the suction part of the second flow path is formed below the indoor air inlet. The air backflow prevention part is formed below the outdoor air inlet where the suction part of the first flow path is located on the basis of the partition wall.

Moreover, the plurality of curved ribs are formed to be different in length from each other.

Furthermore, the curved rib at the downstream side in the air flow direction of the first flow path is formed to be longer in the circumferential direction than the curved rib at the upstream side.

Advantageous Effects

The blowing unit of the air conditioner for a vehicle according to the present invention can effectively suppress a flow of air flowing backward around the scroll bell mouth, thereby effectively preventing blade passing frequency noise (BPT) caused by intake flow imbalance between the moving path of the indoor air and the moving path of the outdoor air and preventing an increase of manufacturing costs due to the air backflow preventing unit implemented easily.

Moreover, the blowing unit of the air conditioner for a vehicle according to the present invention can more effectively prevent a back flow of air since the first curved rib is formed to be longer than the flow start part of air in the circumferential direction of the scroll case.

MODE FOR INVENTION

Hereinafter, a technical configuration of a blowing unit of an air conditioner for a vehicle according to the present invention will be described in detail.

Figure 1:
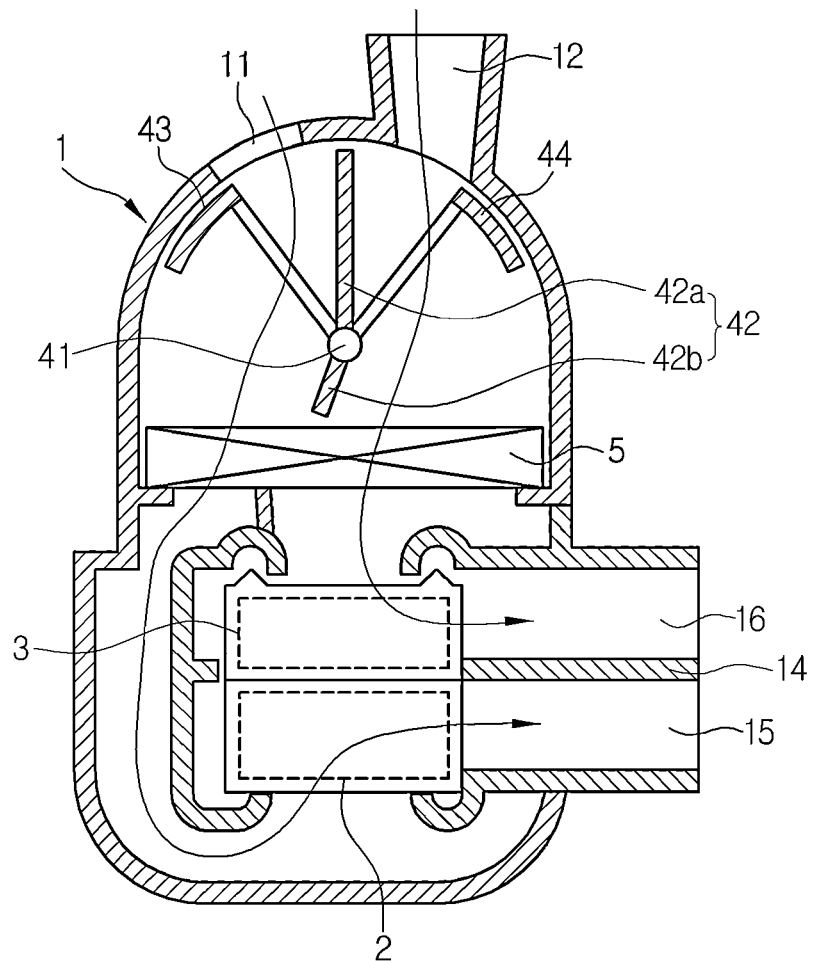
FIG. 1 is a cross-sectional view illustrating a blowing unit of a conventional two-layer air conditioner for a vehicle.
Figure 2:
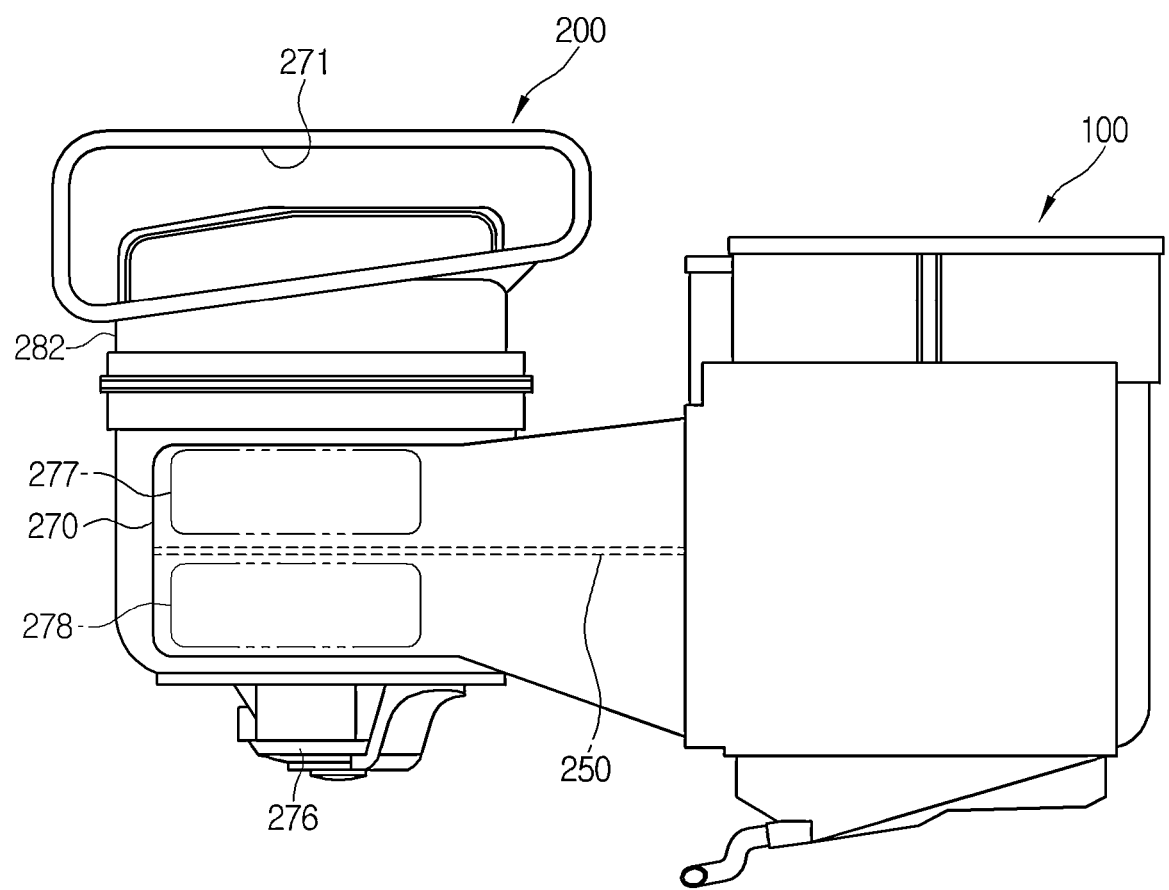
FIG. 2 is a front view illustrating an air conditioner for a vehicle according to a first embodiment of the present invention.
Figure 3:
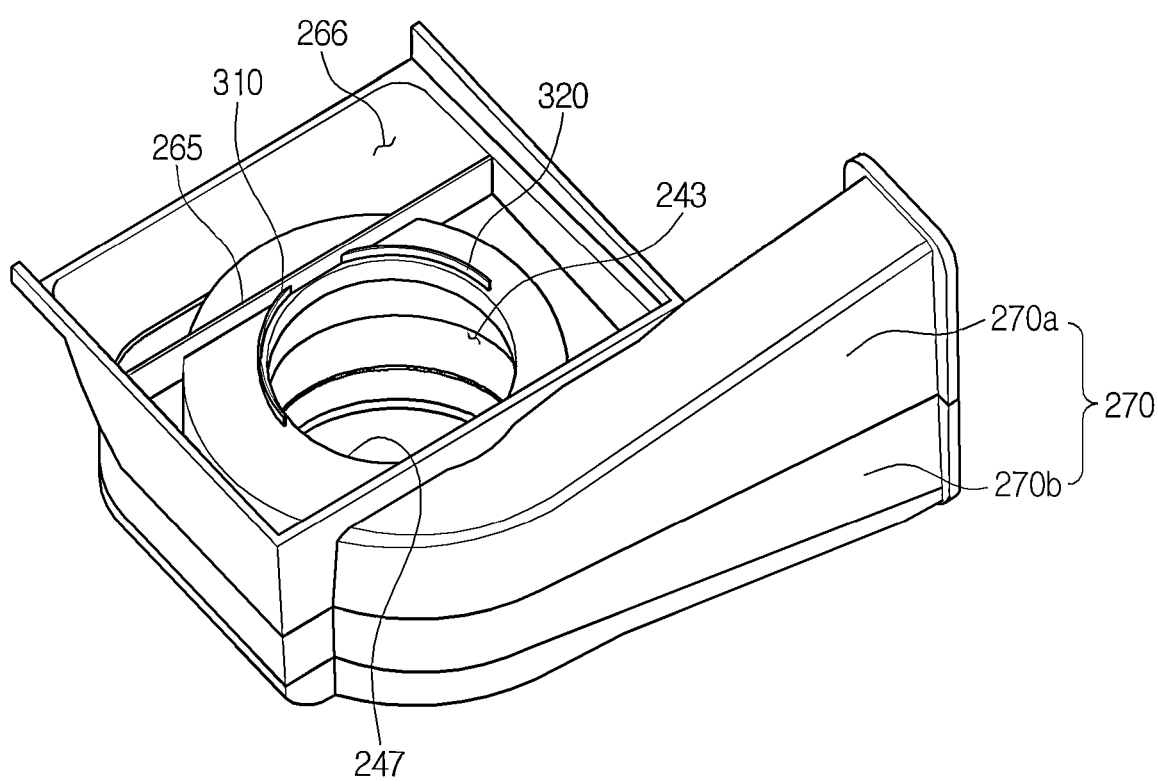
FIG. 3 is a perspective view illustrating a scroll case according to the first embodiment of the present invention.
Figure 4:
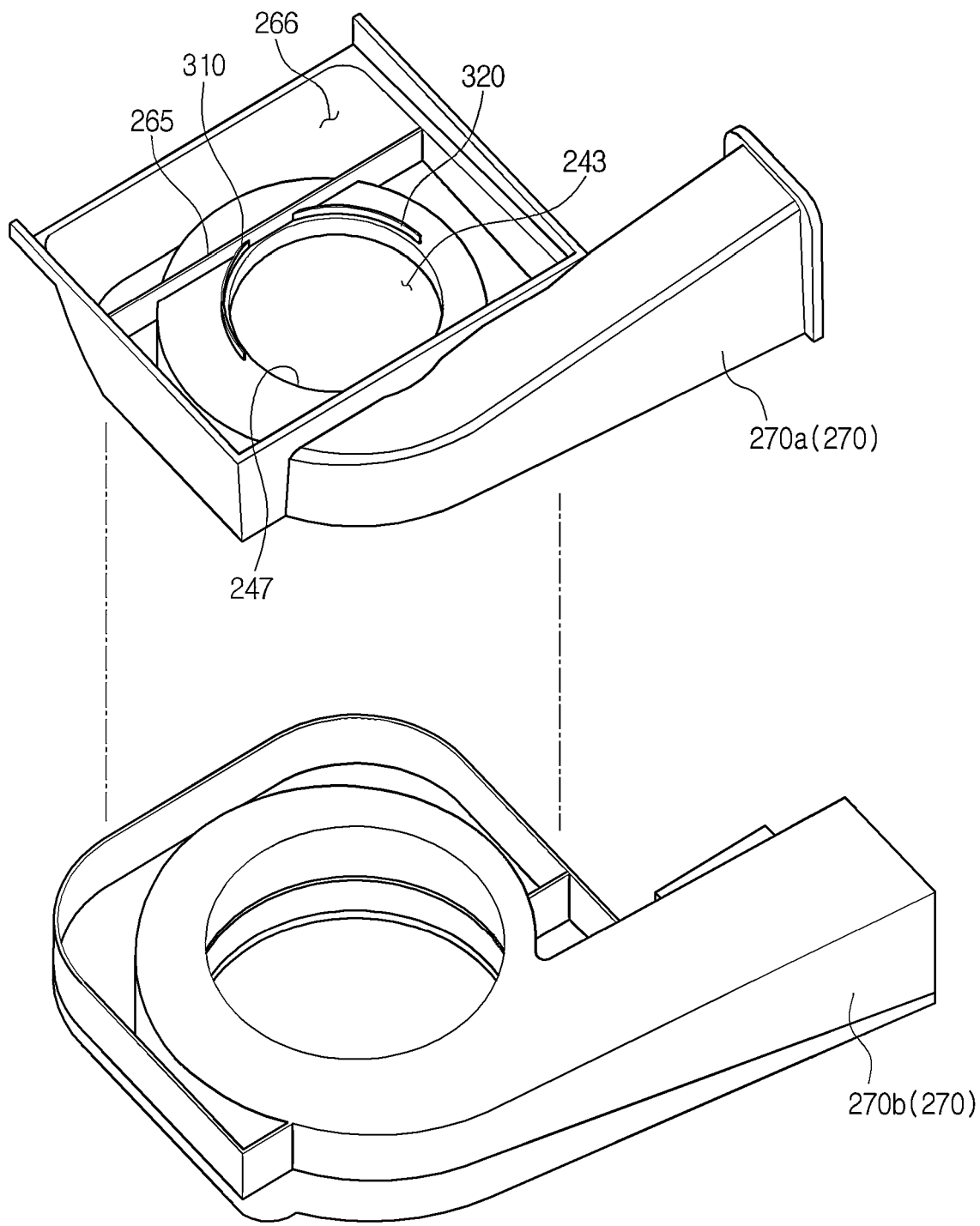
FIG. 4 is an exploded perspective view of FIG. 3.
Figure 5:
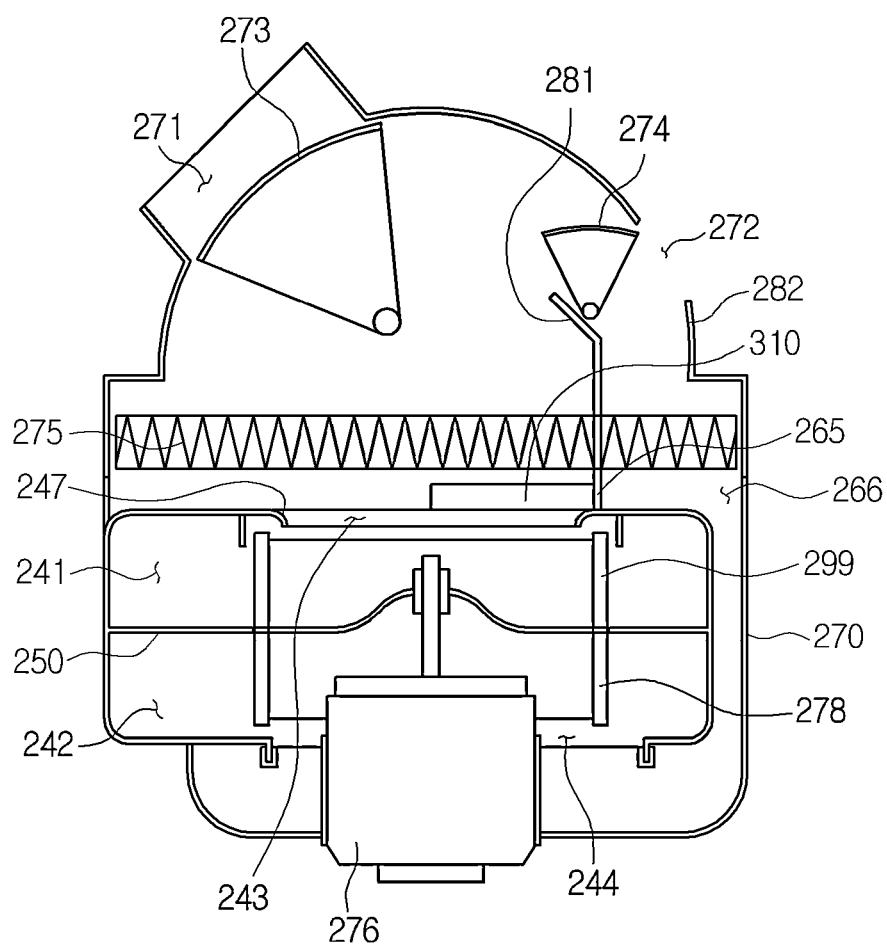
FIG. 5 is a cross-sectional view illustrating a blowing unit according to the first embodiment of the present invention.
Figure 6:
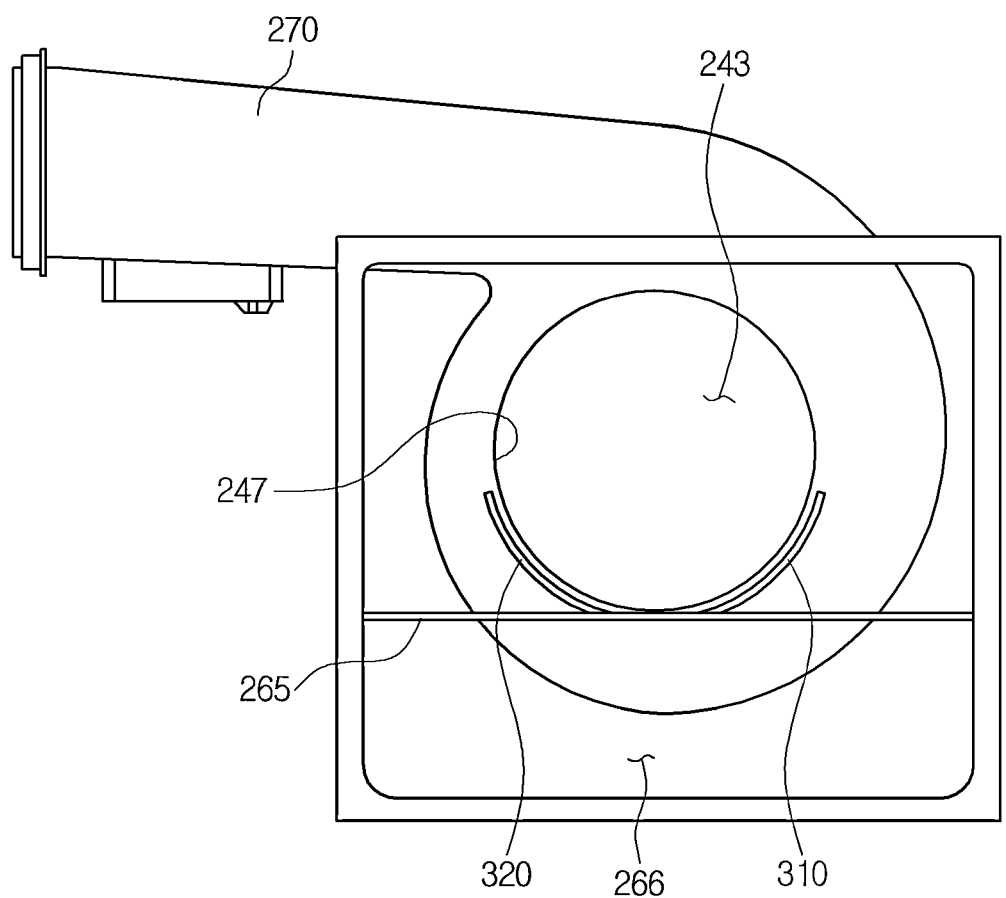
FIG. 6 is a plan view illustrating the scroll case.
Figure 7:
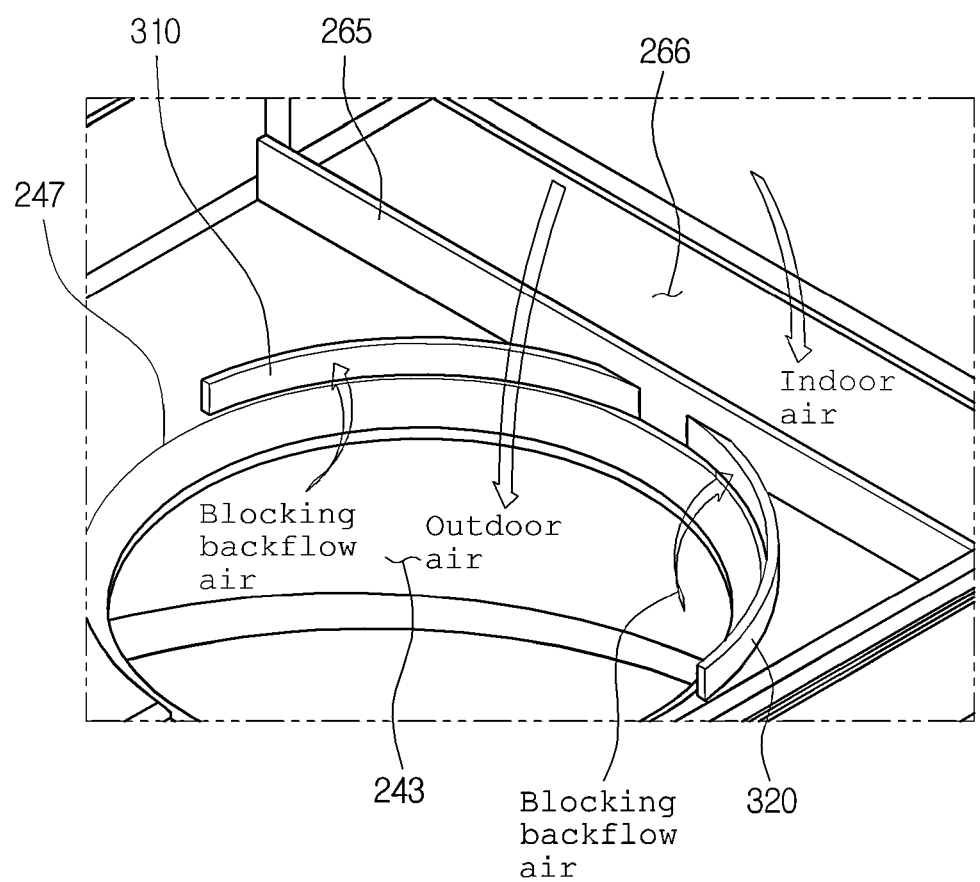
FIG. 7 is an enlarged perspective view of a portion of the scroll case.
Figure 8:
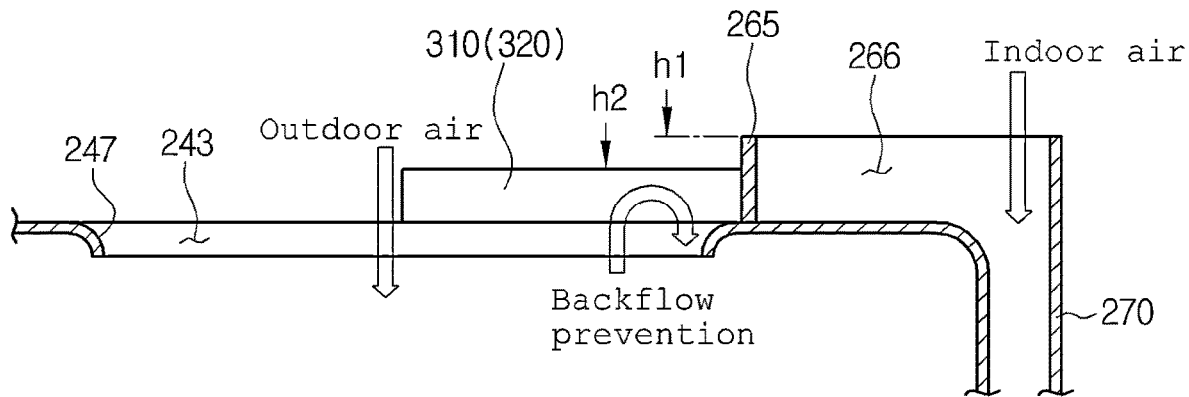
FIG. 8 is a cross-sectional view of FIG. 7.

FIG. 2 is a front view illustrating an air conditioner for a vehicle according to a first embodiment of the present invention, FIG. 3 is a perspective view illustrating a scroll case according to the first embodiment of the present invention, FIG. 4 is an exploded perspective view of FIG. 3, FIG. 5 is a cross-sectional view illustrating a blowing unit according to the first embodiment of the present invention, FIG. 6 is a plan view illustrating the scroll case, FIG. 7 is an enlarged perspective view of a portion of the scroll case, and FIG. 8 is a cross-sectional view of FIG. 7.

Referring to FIGS. 2 to 8, the air conditioner for a vehicle according to the first embodiment of the present invention includes: a blowing unit 200 for introducing indoor air or outdoor air; and an air conditioning unit 100 for air conditioning the air blown from the blowing unit 200 and discharging the air to the interior of the vehicle. The air conditioner for a vehicle has a two-layer structure capable of separately blowing indoor air and outdoor air to secure defogging performance and maintaining high heating performance during heating.

The blowing unit 200 includes a scroll case 270 and an intake case 282 which are coupled with each other.

The intake case 282 is provided on an upper portion of the scroll case 270. The intake case 282 has an indoor air inlet 272 for introducing indoor air and an outdoor air inlet 271 for introducing outdoor air. The indoor air inlet 272 and the outdoor air inlet 271 are formed on the upper side of the intake case 282. An indoor air door 274 adjusts the degree of opening of the indoor air inlet 272, and the outdoor air door 273 adjusts the degree of opening of the outdoor air inlet 271. The intake case 282 includes an air filter 275 for filtering air passing through the air filter 275.

The scroll case 270 is configured to separately suck the indoor air and the outdoor air. A first flow path 241 and a second flow path 242 are formed in the scroll case 270 to be partitioned. The first flow path 241 is disposed above the second flow path 242, and the outdoor air flows through the first flow path 241 and the indoor air flows through the second flow path 242. A first blower wheel 277 is provided in the first flow path 241, and a second blower wheel 278 is provided in the second flow path 242. The first blower wheel 277 and the second blower wheel 278 are rotated by a blower motor 276.

The scroll case 270 includes an upper scroll case 270a and a lower scroll case 270b. The upper scroll case 270a is coupled to the top of the lower scroll case 270b. The first flow path 241 is formed in the upper scroll case 270a, and the second flow path 242 is formed in the lower scroll case 270b. The first flow path 241 and the second flow path 242 are partitioned into upper and lower parts by a separation wall 250.

The first blower wheel 277 and the second blower wheel 278 rotate to introduce air in an axial direction of a blower motor 276 to blow the air in a radial direction. The outdoor air introduced into the outdoor air inlet 271 is introduced into the first flow path 241 by the first blower wheel 277, and then, is discharged to the interior through the upper flow path of the air conditioning unit 100. The indoor air introduced into the indoor air inlet 272 is introduced into the second flow path 242 by the second blower wheel 278, and then, is discharged to the interior through the lower flow path of the air conditioning unit 100.

The scroll case 270 includes an upper suction port for introducing air into the first flow path 241 and a lower suction port 244 for introducing air into the second flow path 242. Furthermore, the scroll case 270 includes a suction part 243 of the first flow path 241 and a suction part 266 of the second flow path 242. In addition, the air introduced into the suction part 266 of the second flow path 242 bypasses through a lateral flow path of the first flow path 241, and then, is sucked upward through the lower suction port 244.

That is, the upper suction port of the first flow path 241 has a circular hole formed along a bell mouth 247 and is identical to the suction part 243 of the first flow path 241. On the other hand, the lower suction port 244 of the second flow path 242 is formed on the lower surface of the lower scroll case 270*b*, and the suction part 266 of the second flow path 242 is formed on the upper surface of the upper scroll case 270*a*.

The outdoor air introduced through the outdoor air inlet 271 is sucked through the suction part 243 of the first flow path 241, that is, through the upper suction port, and flows to the first flow path 241. The indoor air introduced through the indoor air inlet 272 makes a "U" turn after moving downward through the suction part 266 of the second flow path 242, and then, is sucked upward through the lower suction port 244 to move to the second flow path 242.

A partition wall 265 is provided in the scroll case 270. The partition wall 265 functions to distinguish the suction part 243 of the first flow path 241 from the suction part 266 of the second flow path 242. The partition wall 265 protrudes upward from the upper surface of the upper scroll case 270*a*. The suction part 243 of the first flow path 241 is formed at a lower portion of the outdoor air inlet 271, and the suction part 266 of the second flow path 242 is formed at a lower portion of the inner air inlet 272. The suction part 266 of the second flow path 242 is formed in a lateral direction of the suction part 243 of the first flow path 241.

An air filter 275 is disposed at an upper end of the partition 265, and a wall member may be formed on the air filter 275 to partition the indoor air and the outdoor air. A partition member 281 extending upward from an upper surface of the air filter 275 is formed on an upper surface of the air filter 275. The partition member 281 is integrally formed with the intake case 282. The outdoor air and the indoor air are separately guided to the suction part 243 of the first flow path 241 and the suction part 266 of the second flow path 242 by the partition member 281 and the partition wall 265.

The blowing unit 200 includes an air backflow prevention part. The air backflow prevention part is provided on the partition wall 265, and functions to prevent air flowing into one of the first flow path 241 or the second flow path 242 from flowing backward to the other. Specifically, the air backflow prevention part functions to prevent air flowing into the first flow path 241 from flowing backward to the second flow path 242.

As described above, through the configuration of the air backflow prevention part, the present invention can solve the problem of fan passing frequency noise (BPT) caused by the imbalance of the suction flow between the moving path of the indoor air and the moving path of the outdoor air.

More specifically, the air backflow prevention part includes a plurality of curved ribs. The curved ribs extend linearly from the partition wall 265 in a scroll direction of the suction part 243 of the first flow path 241. The plurality of curved ribs are separately arranged in the scroll direction. In the present embodiment, there are two curved ribs of a first curved rib 310 and a second curved rib 320.

The first curved rib 310 and the second curved rib 320 are spaced apart from each other at a predetermined distance, and are symmetrically formed at both sides based on the partition wall 265. The first curved rib 310 and the second curved rib 320 are formed around the suction part 243 of the first flow path 241. That is, the first curved rib 310 and the second curved rib 320 extend along the circumference of the bell mouth 247 of the upper suction port of the first flow path 241.

Through the configuration, the present invention can suppress the flow of air flowing backward around the bell mouth 247 of the upper scroll case 270*a*, and solve the noise problem by smoothly sucking the air into the suction part 243 of the first flow path 241, thereby minimizing flow resistance of air without hindering air-conditioning performance.

As a result, the first curved rib 310 and the second curved rib 320 block the outdoor air flowing into the suction part 243 of the first flow path 241 from flowing back to the suction part 266 of the second flow path 242. The outdoor air introduced into the outdoor air inlet 271 forms a moving path like a straight line in the downward direction.

The outdoor air is mostly blown to the air conditioning unit 100 through the first blower wheel 277 inside the first flow path 241, but some of the outdoor air flows back upward and moves along the periphery of the bell mouth 247 toward the suction part 266 of the second flow path 242. The first curved rib 310 and the second curved rib 320 prevent the outdoor air flowing into the suction part 243 of the first flow path 241 from flowing back to the suction part 266 of the second flow path 242, thereby solving the noise problem.

The first curved rib 310 and the second curved rib 320 protrude upward from the upper surface of the upper scroll case 270*a*. In this instance, the protruding height h2 of the first curved rib 310 and the second curved rib 320 is equal to or smaller than the protruding height h1 of the partition wall 265. Therefore, since the upper ends of the first curved rib 310 and the second curved rib 320 do not interfere with the air filter 275, the present invention does not increase the overall package of the blowing unit 200, and sufficiently performs the backflow prevention function within a range of the protruding height of the partition wall 265.

In addition, the first curved rib 310 and the second curved rib 320 are formed below the outdoor air inlet 271 at which the suction part 243 of the first flow path 241 is positioned on the basis of the partition wall 265. Moreover, the first curved rib 310 and the second curved rib 320 are formed to be less than half of the suction part 243 of the first flow path 241 in the circumferential direction. Therefore, the present invention can minimize a resistance of the air flow through the suction part 243 of the first flow path 241, but suck the outdoor air smoothly, thereby effectively preventing backflow of the outdoor air.

Meanwhile, since the first curved rib 310 and the second curved rib 320 integrally extend from the partition wall 265, when the upper scroll case 270*a* is injection-molded, the first curved rib 310 and the second curved rib 320 can be integrally formed. Therefore, it is possible to easily implement the air backflow prevention part without increasing manufacturing costs just by modifying a mold of the upper scroll case 270a.

Figure 9:
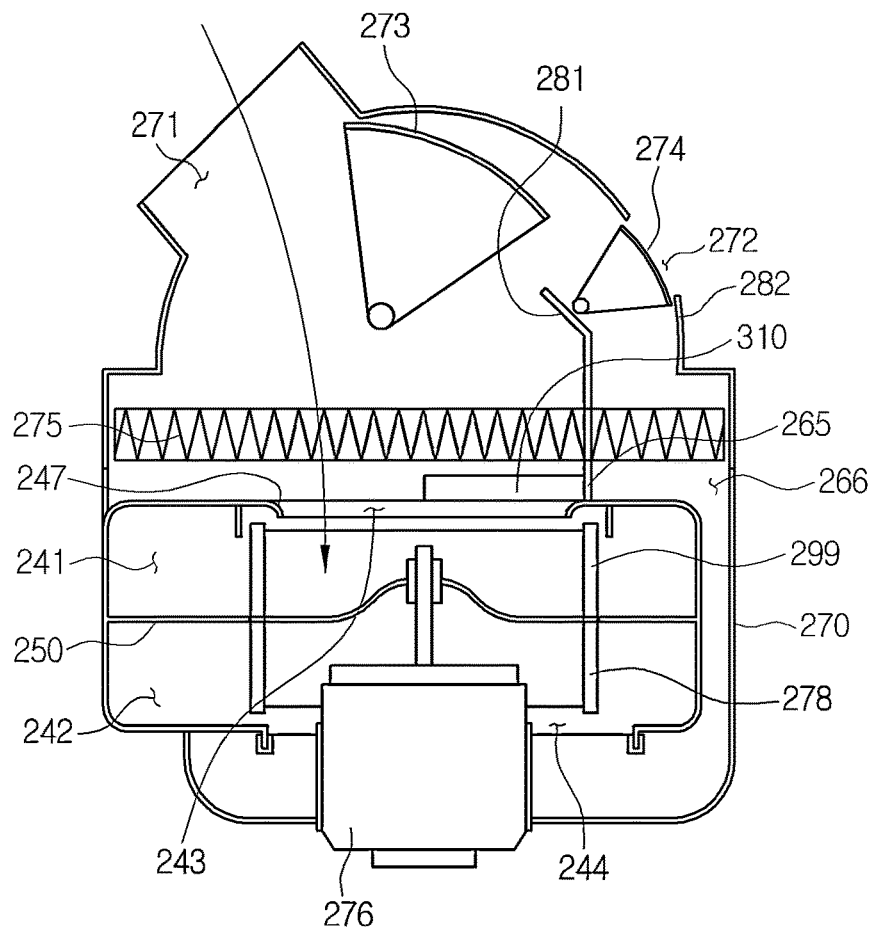
FIG. 9 illustrates an outdoor air mode of the blowing unit according to the first embodiment of the present invention.

FIG. 9 illustrates an outdoor air mode of the blowing unit according to the first embodiment of the present invention.

Referring to FIG. 9, in the outdoor air mode, the outdoor air door 273 opens the outdoor air inlet 271 and the indoor air door 274 closes the inner air inlet 272. The outdoor air introduced through the outdoor air inlet 271 is introduced through the suction part 243 of the first flow path 241, and is discharged to the interior of the vehicle along the first flow path 241. In this case, the outdoor air sucked into the suction part 243 of the first flow path 241 is prevented from flowing backward to the suction part 266 of the second flow path 242 by the first curved rib 310 and the second curved rib 320.

Figure 10:
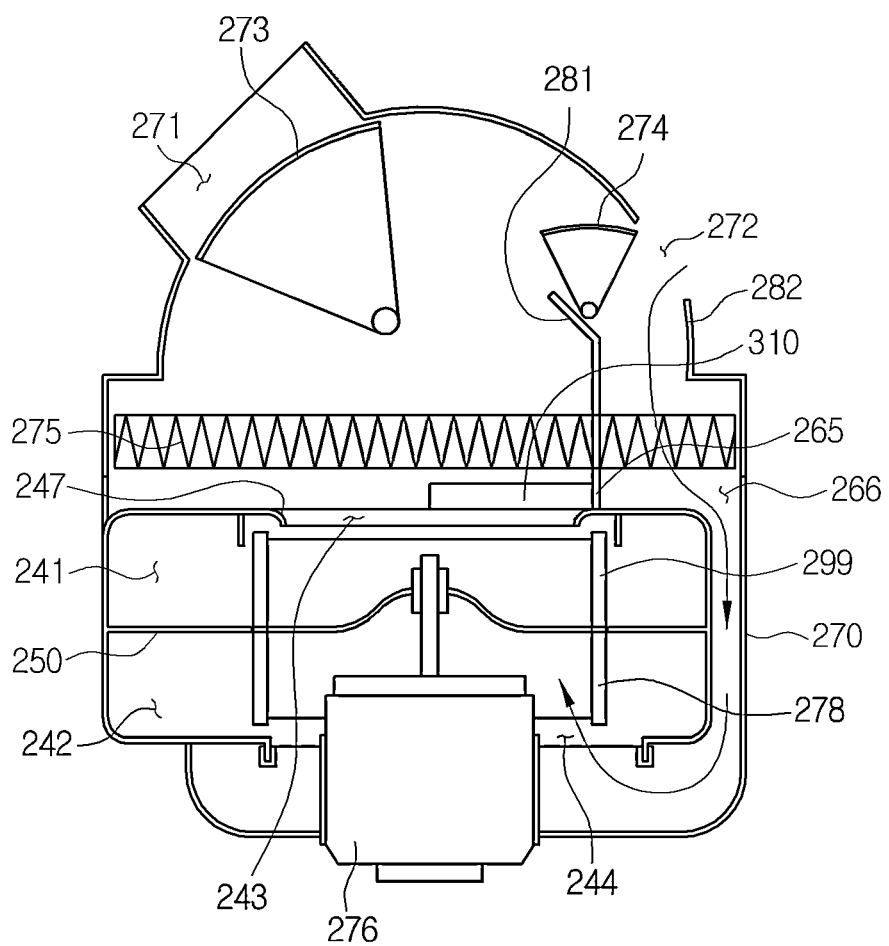
FIG. 10 illustrates an indoor air mode of the blowing unit according to the first embodiment of the present invention.

FIG. 10 illustrates an indoor air mode of the blowing unit according to the first embodiment of the present invention.

Referring to FIG. 10, in the indoor air mode, the outdoor air door 273 closes the outdoor air inlet 271 and the indoor air door 274 opens the indoor air inlet 272. The indoor air introduced through the indoor air inlet 272 is introduced through the suction part 266 of the second flow path 242 and moves downward. The indoor air makes a "U" turn to be sucked upward through the lower suction port 244, and then, is discharged to the interior of the vehicle along the second flow path 242.

Figure 11:
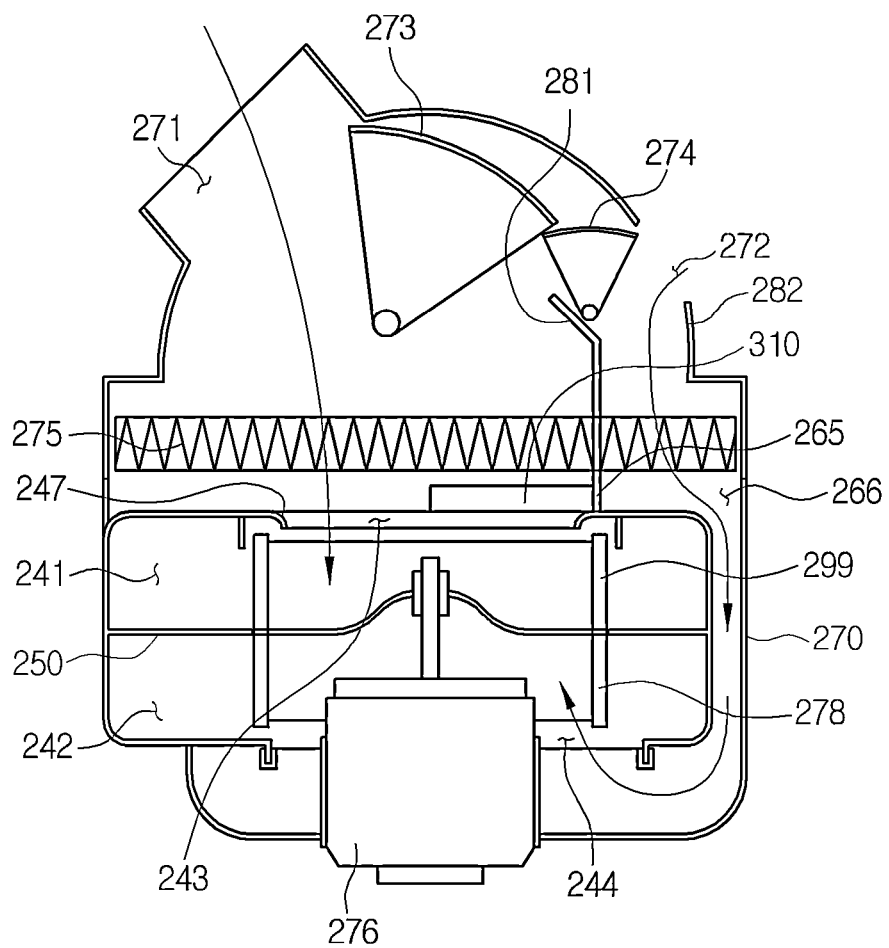
FIG. 11 illustrates a two-layer mode of the blowing unit according to the first embodiment of the present invention.

FIG. 11 illustrates a two-layer mode of the blowing unit according to the first embodiment of the present invention.

Referring to FIG. 11, in the two-layer mode, the outdoor air door 273 opens the outdoor air inlet 271 and the indoor air door 274 opens the indoor air inlet 272. The outdoor air introduced through the outdoor air inlet 271 is introduced through the suction part 243 of the first flow path 241, and then, is discharged to the interior of the vehicle along the first flow path 241.

Furthermore, the indoor air introduced through the indoor air inlet 272 is introduced through the suction part 266 of the second flow path 242 and moves downward. After that, the indoor air makes a "U" turn to be sucked upward through the lower suction port 244, and then, is discharged to the interior of the vehicle along the second flow path 242. In this case, the outdoor air sucked into the suction part 243 of the first flow path 241 is prevented from flowing backward to the suction part 266 of the second flow path 242 by the first curved rib 310 and the second curved rib 320.

Figure 12:
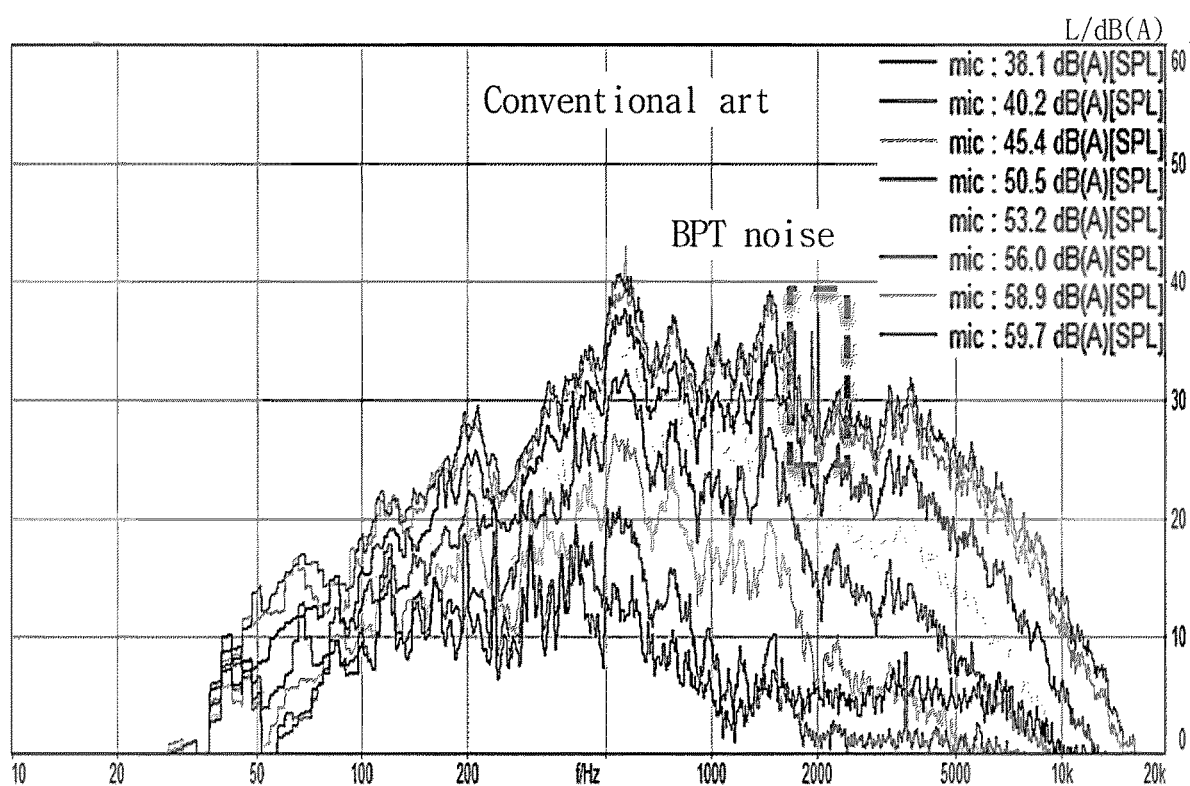
FIG. 12 is a view showing a noise evaluation result of the blowing unit according to the conventional art.
Figure 13:
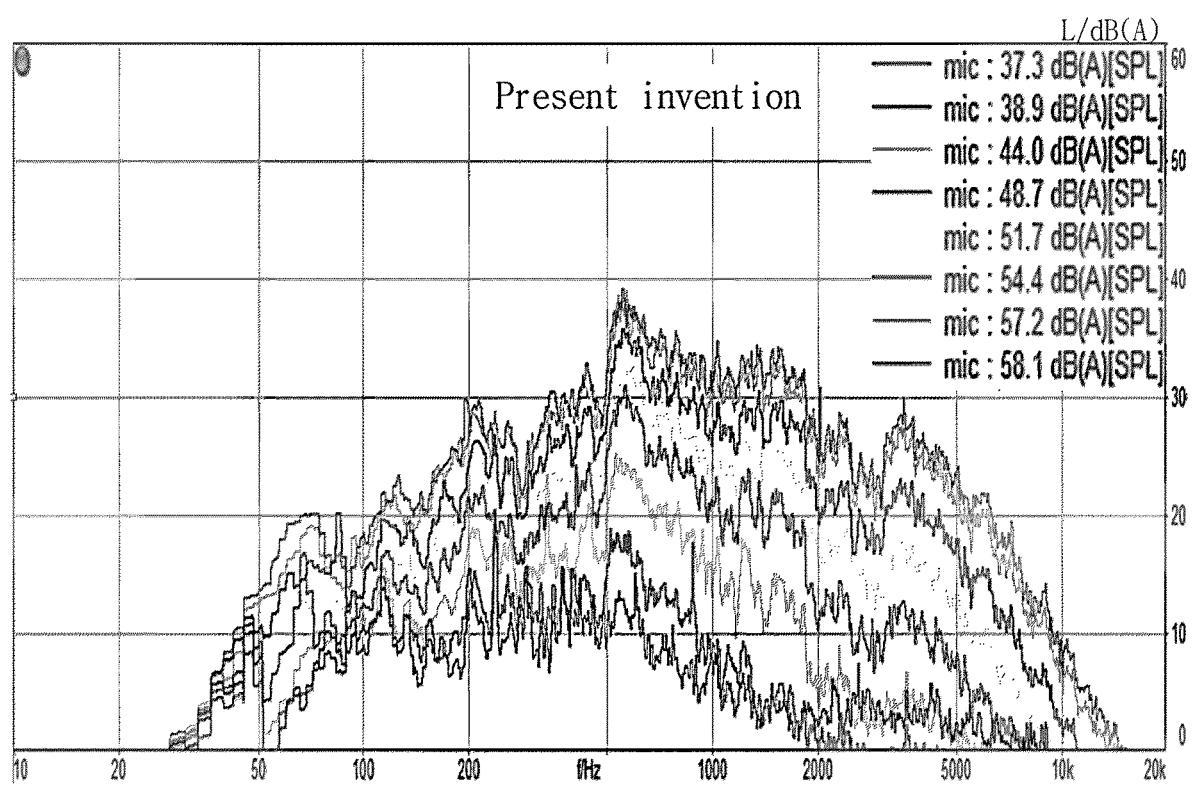
FIG. 13 is a view showing a noise evaluation result of the blowing unit according to the first embodiment of the present invention.

FIG. 12 is a view showing a noise evaluation result of the blowing unit according to the conventional art, and FIG. 13 is a view showing a noise evaluation result of the blowing unit according to an embodiment of the present invention.

Referring to FIG. 12, in the case of the conventional blowing unit which has no air backflow prevention part, it was checked that fan passing frequency noise (BPT) suddenly occurred in an approximately 2000 F/SQZ section as indicated by a dotted line while the blower wheel runs for five seconds at the eighth stage. Referring to FIG. 13, in the case of the blowing unit according to the present invention in which the air backflow prevention part is provided, it was checked that there was no BPT noise in all sections while the blower wheel runs for five seconds at the eighth stage, and the overall noise was reduced by about 1.6 dB compared to the conventional art.

Figure 14:
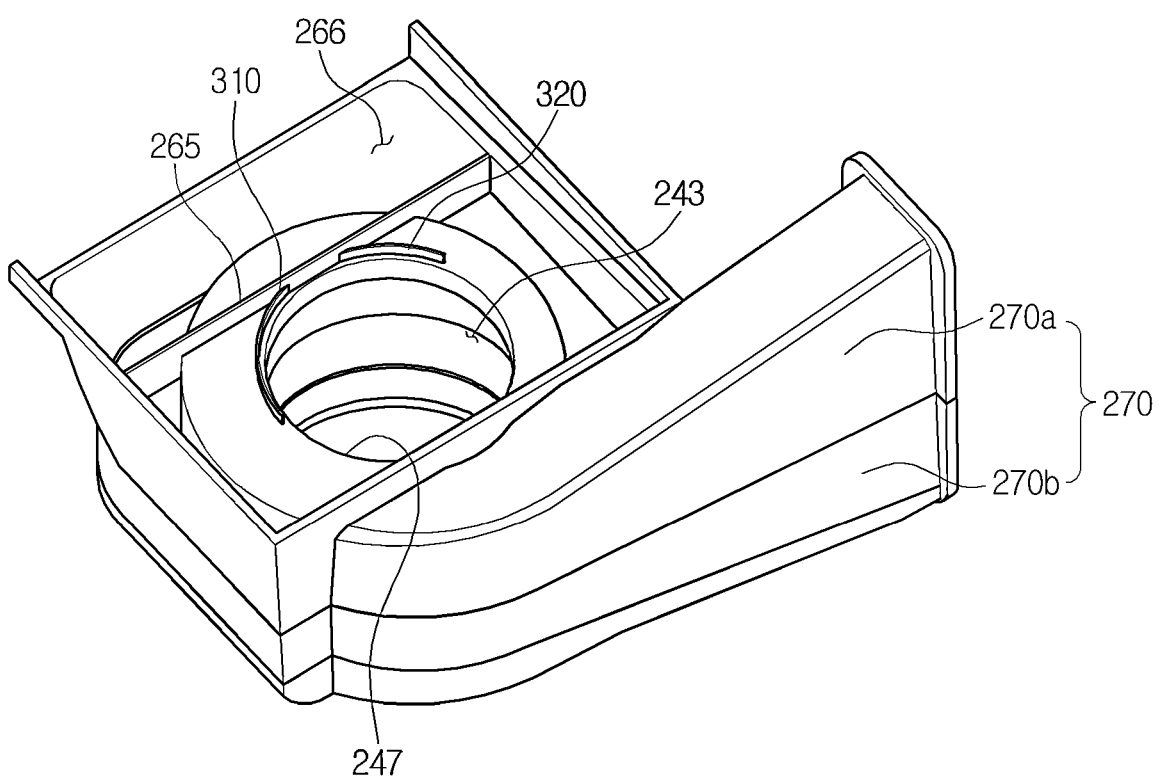
FIG. 14 is a perspective view illustrating a scroll case according to a second embodiment of the present invention.
Figure 15:
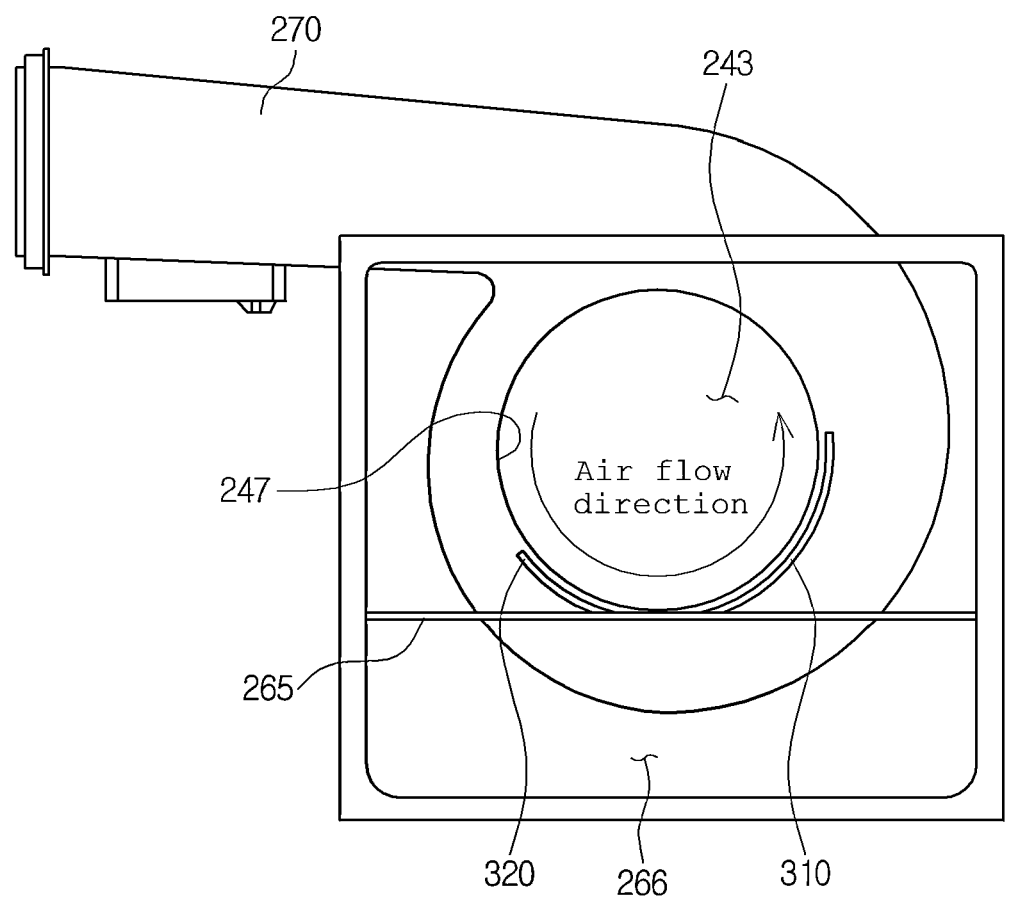
FIG. 15 is a top view of FIG. 14.

FIG. 14 is a perspective view illustrating a scroll case according to a second embodiment of the present invention, and FIG. 15 is a top view of FIG. 14. In the second embodiment of the present invention, the configuration of the curved rib of the first embodiment is changed, and now, only the changed configuration will be described in detail.

Referring to FIGS. 14 and 15, the scroll case 270 according to the second embodiment of the present invention includes an upper scroll case 270a and a lower scroll case 270b. A first flow path 241 is formed in the upper scroll case 270a, and a second flow path 242 is formed in the lower scroll case 270b (see the drawings illustrating the first embodiment). The upper suction port of the first flow path 241 is a circular hole formed along the bell mouth 247 and is the same as the suction part 243 of the first flow path 241.

A partition wall 265 is provided in the scroll case 270. The partition wall 265 functions to distinguish the suction part 243 of the first flow path 241 from the suction part 266 of the second flow path 242. The blowing unit 200 includes an air backflow prevention part. The air backflow prevention part includes a plurality of curved ribs. The curved ribs extend in a streamlined shape along a scroll direction of the suction part 243 of the first flow path 241 from the partition wall 265.

The plurality of curved ribs are separately arranged in the scroll direction. In this embodiment, there are two curved ribs having a first curved rib 310 and a second curved rib 320. The plurality of curved ribs 310 and 320 have different lengths from each other. That is, the curved rib at the downstream side in the air flow direction of the first flow path 241 is longer in the circumferential direction than the curved rib at the upstream side.

More specifically, the first curved rib 310 is formed downstream of the second curved rib 320 in the air flow direction. The first curved rib 310 is longer in the circumferential direction than the second curved rib 320. Since the outdoor air flowing along the scroll case 270 of the first flow path 241 has more air volume at a region which scrolls the bell mouth 247 along the circumference in the circumferential direction, there is a high possibility of backflow.

So, the first curved rib 310 is formed to be longer at the downstream side than the portion where the flow of air starts in the circumferential direction of the scroll case 270, thereby more effectively preventing the backflow of air.

The invention claimed is:

1. A blowing unit of an air conditioner for a vehicle, which has a scroll case in which a first flow path and a second flow path are partitioned so as to separately suck indoor air and outdoor air, the blowing unit comprising: a partition wall for dividing a suction part of the first flow path and a suction part of the second flow path in the scroll case; and an air backflow prevention part disposed on the partition wall to prevent air flowing into one of the first flow path or the second flow path from flowing backward to the other; wherein the air backflow prevention part includes a plurality of curved ribs extending from the partition wall in a scroll direction of the suction part of the first flow path; and wherein the curved ribs circumscribe a portion of a bell mouth and tangentially intersect the partition plate.

2. The blowing unit according to claim 1, wherein the first flow path is disposed above the second flow path, and
wherein the suction part of the second flow path is formed in the lateral direction of the suction part of the first flow path, and the air backflow prevention part is formed around the suction part of the first flow path.

3. The blowing unit according to claim 2, wherein the scroll case includes an upper suction port for introducing air into the first flow path and a lower suction port for introducing air into the second flow path, and
wherein the air backflow prevention part extends along the circumference of a bell mouth of the upper suction port.

4. The blowing unit according to claim 2, wherein the scroll case includes an upper scroll case and a lower scroll case, and wherein the air backflow prevention part protrudes upward from the upper surface of the upper scroll case.

5. The blowing unit according to claim 1, wherein the outdoor air flows through the first flow path and the indoor air flows through the second flow path, and the air backflow prevention part blocks the outdoor air introduced into the suction unit of the first flow path from flowing backward to the second flow path.

6. The blowing unit according to claim 5, wherein the scroll case includes an upper suction port for introducing air into the first flow path and a lower suction port for introducing air into the second flow path, and wherein the air backflow prevention part extends along the circumference of a bell mouth of the upper suction port.

7. The blowing unit according to claim 5, wherein the scroll case includes an upper scroll case and a lower scroll case, and wherein the air backflow prevention part protrudes upward from the upper surface of the upper scroll case.

8. The blowing unit according to claim 4, wherein the plurality of curved ribs are arranged to be spaced apart from one another in the scroll direction.

9. The blowing unit according to claim 8, wherein the curved ribs are composed of a first curved rib and a second curved rib which are symmetrically extended at both sides on the basis of the partition wall and are spaced apart from each other.

10. The blowing unit according to claim 9, wherein the first curved rib and the second curved rib are formed to be less than half of the suction part of the first flow path in the circumferential direction.

11. The blowing unit according to claim 8, wherein the plurality of curved ribs are formed to be different in length from each other.

12. The blowing unit according to claim 11, wherein the curved ribs at the downstream side in the air flow direction of the first flow path is formed to be longer in the circumferential direction than the curved ribs at the upstream side.

13. The blowing unit according to claim 1, wherein the scroll case includes an upper scroll case and a lower scroll case, and wherein the air backflow prevention part protrudes upward from the upper surface of the upper scroll case.

14. The blowing unit according to claim 13, wherein the protruding height of the air backflow prevention part is equal to or smaller than the protruding height of the partition wall.

15. The blowing unit according to claim 1, wherein the scroll case includes and upper section port for introducing air into the first flow path and a lower suction port for introducing air in to the second flow path.

16. The blowing unit according to claim 15, wherein the air introduced into the suction part of the second flow path bypasses through a lateral flow path of the first flow path, and then, is sucked upward through the lower suction port.

17. The blowing unit according to claim 1, wherein the suction part of the first flow path is formed below the outdoor air inlet, and the suction part of the second flow path is formed below the indoor air inlet, and wherein the air backflow prevention part is formed below the outdoor air inlet where the suction part of the first flow path is located on the basis of the partition wall.

* * * * *